F. REDDAWAY.
VEHICLE OF THE SELF LAYING TRACK TYPE.
APPLICATION FILED JAN. 24, 1920.
1,400,100.
Patented Dec. 13, 1921.
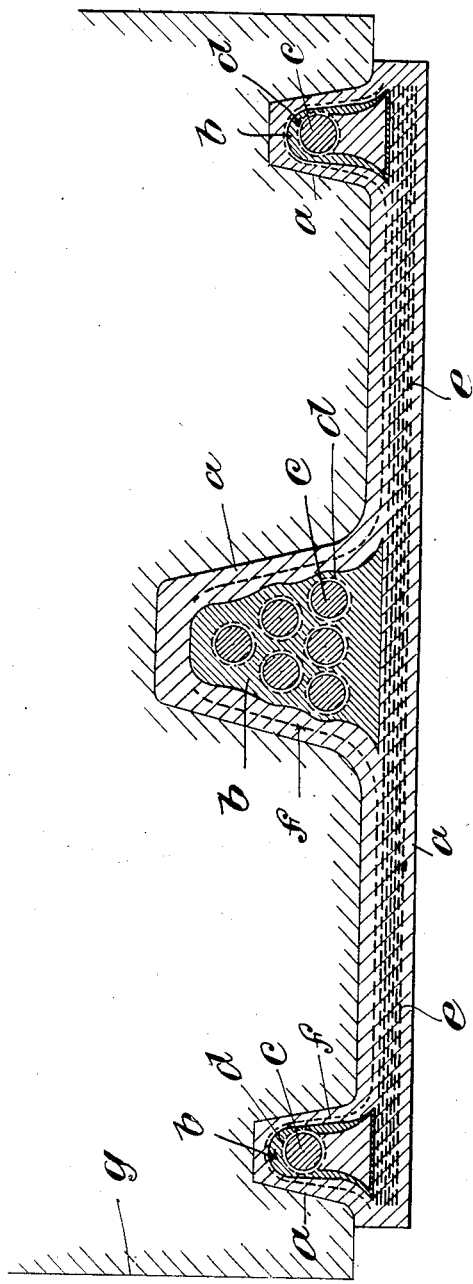
INVENTOR:
Frank Reddaway
By Wm Wallace White
ATTY.

UNITED STATES PATENT OFFICE.

FRANK REDDAWAY, OF PENDLETON, MANCHESTER, ENGLAND.

VEHICLE OF THE SELF-LAYING-TRACK TYPE.

1,400,100.   Specification of Letters Patent.   Patented Dec. 13, 1921.

Application filed January 24, 1920. Serial No. 353,773.

*To all whom it may concern:*

Be it known that I, FRANK REDDAWAY, a subject of the King of Great Britain and Ireland, residing at Cheltenham street, Pendleton, Manchester, in the county of Lancaster, England, have invented new and useful Improvements in or Relating to Vehicles of the Self-Laying-Track Type, of which the following is a specification.

The invention has reference principally to a flexible belt or band for motors or other vehicles of self-laying track type in which such endless belt or band passes over carrier pulleys or wheels suspended clear of the road and beneath road wheels which take the load of the vehicle. One or more of such carrier pulleys is or are driven by a motor so that the endless band not only constitutes a self-laying track for the road wheels but also propels the vehicle. The road wheels, of any desired number, in this type of vehicle are so mounted as to be able, singly and collectively, to yield in a vertical direction to inequalities in or obstacles on the road.

My invention consists in forming the self-laying track from an endless flexible belt of any desired width, with the provision of means whereby lateral strains can be successfully resisted, to obviate any liability of such strains forcing the belt off the carrier or driving pulleys.

I make such endless belt of any desired width (which would vary according to the size and weight of the vehicle) from canvas or material of any suitable fiber, either animal, or vegetable, built up in woven, plaited or cord layers combined with vulcanized rubber or other substance or compound of an adhesive nature or having binding properties. I may have a comparatively thick rubber tread or road contacting surface. The other side of the belt, which is the contact surface for the carrier or driving pulleys and the road pulleys, is provided with one or more continuous longitudinally arranged projections or ribs engaging with a similarly formed recess or recesses in the periphery of the carrier or driving pulleys. For instance, in the case of a narrow belt for a light vehicle, one central projecting rib running longitudinally along the belt may be used with a corresponding recess in the periphery of the driving pulleys. For a wider and stronger belt, besides a strong central projecting rib there may be a continuous projection or rib at each edge of the belt to serve as guiding means, and for still wider belts any desired number of such longitudinal ribs may be used. These longitudinally arranged projecting ribs may be formed in any convenient manner, such as from vulcanized rubber reinforced with insertions of canvas. They may have square or beveled sides, and rounded at the apex, or be of any desired shape in cross section. I do not confine myself to making the belt from canvas and rubber as other material may be used.

As a result of experiments, in making a belt for a heavy vehicle particularly, I find that a belt with a comparatively large center rib is necessary to maintain it in position by resisting side strains, together with side ribs of smaller cross sectional area which serve to guide and centralize the belt. Difficulties have been encountered, however, in making such a belt with the necessary flexibility to enable it to be directed around the driving pulleys and under tension pulleys, for which purpose the belt should be capable of bending easily in both directions and without distortion or undue strain being imposed upon it. These difficulties have been overcome, and a strong and flexible endless belt has been produced, by forming the larger central rib in the following manner and which is illustrated in the accompanying drawing showing a section of the belt. The outer skin $a$ of such central rib, in common with the rest of the belt, is made of comparatively hard vulcanized rubber, the rib however containing a heart or core $b$ of soft very resilient rubber. This soft resilient heart $b$ is fortified by the insertion therein of a number of thick cords of soft rubber $c$ each inclosed in an envelop $d$ of plaited textile fiber, such as cotton or hemp. The envelop $d$ is plaited in order that the flexibility of the cord $c$ shall not be affected, a plaited fiber envelop being superior to any other kind of fabric for this purpose. These fortifying cords may in some cases be dispensed with, such as with a comparatively light belt. The side ribs have also an insertion $b$ of soft rubber and a cord $c$ of soft rubber with envelop $d$ of plaited textile material. These side ribs serve to guide the belt, the larger central rib resisting cross or lateral strains and maintaining the belt in position. The outer tread of the endless belt is made up of wrappings or layers $e$ of canvas, or material of any suitable fiber, combined with vulcanized rubber. To resist longitudinal stretching, such wrappings of canvas or the like are cut in straight lengths. To fortify the longitudinal ribs, however, and to obtain the necessary flexibility of the same, an insertion in the outer skin of the ribs, of cotton canvas *f* or the like, cut on the bias is used.

The driving pulleys and the road or weight supporting wheels, indicated at *g* in the drawing, are provided with a recess or recesses in their peripheries to receive the longitudinal ribs on the belt.

The side or face of the belt forming the track may have corrugations or ribs or applied devices in order to provide an additional grip between the belt and the road.

My invention is a factor contributing essentially to the successful working of a vehicle of the type described. It may be applied to any type of vehicle from the heavy tractors to the smallest size of motor car or vehicle (either motor or manually propelled) such vehicles having decided advantages over ordinary wheeled vehicles. There is an absence of slip or creep enabling the power of the motor to be utilized to the full, and no liability to side slip. Inequalities of the road surface and obstacles can be overcome without jeopardizing the stability of the body of the vehicle which would remain steady under any conditions of road surface. The utility of the vehicle therefore is not confined to ordinary roads, as in case of necessity it can be driven where no roads exist, or across country and over what would be obstacles insurmountable to the ordinary wheeled vehicle.

I declare that what I claim is.

1. As an article of manufacture, a flexible traction member, having a tread surface of vulcanized material, layers of reinforcing material inserted in such tread surface, and a longitudinally extending rib on the opposite side thereof, said rib having an outer casing of vulcanized material and a core of rubber softer than the outer shell of the rib, said core having therein a flexible cord of soft rubber plaited with an envelop of fibrous material.

2. As an article of manufacture a flexible traction member, having a tread surface of vulcanized material, layers of reinforcing material inserted in such tread surface, and a longitudinally extending rib on the opposite side thereof, said rib having an outer casing of vulcanized material and a core of rubber softer than the outer shell of the rib, said core having therein a plurality of flexible cords of soft rubber each plaited with an envelop of fibrous material.

3. As an article of manufacture a flexible traction member having a tread surface of vulcanized material, layers of reinforcing material inserted in such tread surface, and a plurality of longitudinally extending ribs each having an outer casing of vulcanized material and a core of rubber softer than the outer shell of the ribs said core having therein a flexible cord of soft rubber plaited with an envelop of fibrous material.

4. As an article of manufacture a flexible traction member, having a tread surface of vulcanized material, layers of reinforcing material inserted in such tread surface and a plurality of longitudinally extending ribs at one side of said member having an outer casing of vulcanized material and a core of rubber softer than the outer shell of the ribs, said core having therein cords of soft rubber each of said cords being inclosed within a plaited envelop of fibrous material.

5. As an article of manufacture a flexible traction member having a tread surface of vulcanized material, layers of reinforcing material inserted in such tread surface and a plurality of longitudinally extending ribs at one side of said member having an outer casing of vulcanized material and a core of rubber softer than the outer shell of the ribs, said core having therein cords of soft rubber each of said cords being inclosed within a plaited envelop of fibrous material and a layer of fibrous material in the outer walls of the said ribs said layer being cut on the bias.

In testimony whereof I have signed my name to this specification.

FRANK REDDAWAY.